(12) United States Patent
Amini et al.

(10) Patent No.: US 11,125,102 B2
(45) Date of Patent: Sep. 21, 2021

(54) CHEMISTRY BASED METHODS OF MANUFACTURE FOR MAXMET COMPOSITE POWDERS

(71) Applicant: United Technologies Corporation, Farmington, CT (US)

(72) Inventors: Shahram Amini, Berwyn, PA (US); Christopher W. Strock, Kennebunk, ME (US); Weina Li, South Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/539,217

(22) Filed: Aug. 13, 2019

(65) Prior Publication Data

US 2020/0003125 A1 Jan. 2, 2020

Related U.S. Application Data

(62) Division of application No. 14/722,263, filed on May 27, 2015, now Pat. No. 10,378,450.

(Continued)

(51) Int. Cl.
*F01D 11/12* (2006.01)
*B22F 1/02* (2006.01)
(Continued)

(52) U.S. Cl.
CPC ............ *F01D 11/122* (2013.01); *B22F 1/025* (2013.01); *B22F 7/08* (2013.01); *C22C 1/0491* (2013.01);
(Continued)

(58) Field of Classification Search
CPC .... F02C 7/28; B22F 1/025; B22F 7/08; C22C 1/0491; C23C 4/12; C23C 18/1633;
(Continued)

(56) References Cited

U.S. PATENT DOCUMENTS

| | | | |
|---|---|---|---|
| 4,374,173 A | 2/1983 | Adamovic | |
| 4,741,973 A * | 5/1988 | Condit | C23C 18/32 428/553 |

(Continued)

FOREIGN PATENT DOCUMENTS

| | | |
|---|---|---|
| CA | 1141569 A | 2/1983 |
| CN | 104947029 A | 9/2015 |

(Continued)

OTHER PUBLICATIONS

USPTO STIC, Search Report, Generated 2017 for U.S. Appl. No. 14/722,263.

(Continued)

*Primary Examiner* — Eldon T Brockman
(74) *Attorney, Agent, or Firm* — Bachman & LaPointe, P.C.

(57) ABSTRACT

A method of manufacturing a gas turbine engine air seal comprising forming at least one MAX phase particle. The method includes coating the at least one MAX phase particle with a metallic shell. The method includes applying the at least one MAX phase metallic coated particle to a surface of a substrate of the air seal to form an abradable layer of a MAXMET composite abradable material from the at least on MAX phase metallic coated particle.

10 Claims, 2 Drawing Sheets

Related U.S. Application Data

(60) Provisional application No. 62/003,159, filed on May 27, 2014.

(51) Int. Cl.
  *B22F 7/08* (2006.01)
  *C22C 1/04* (2006.01)
  *C23C 4/12* (2016.01)
  C23C 18/16 (2006.01)
  F02C 7/28 (2006.01)

(52) U.S. Cl.
  CPC ............ *C23C 4/12* (2013.01); *C23C 18/1633* (2013.01); *F02C 7/28* (2013.01); *F05D 2220/32* (2013.01); *F05D 2230/90* (2013.01); *F05D 2240/55* (2013.01)

(58) Field of Classification Search
  CPC ............ F01D 11/122; F05D 2240/55; F05D 2230/90; F05D 2220/32
  See application file for complete search history.

(56) References Cited

U.S. PATENT DOCUMENTS

| | | | |
|---|---|---|---|
| 6,190,124 B1 | 2/2001 | Freling et al. | |
| 6,231,969 B1 | 5/2001 | Knight et al. | |
| 6,410,159 B1* | 6/2002 | Hermanek | C23C 4/11 428/570 |
| 6,916,529 B2* | 7/2005 | Pabla | C23C 4/06 428/325 |
| 7,135,240 B2 | 11/2006 | Fiala et al. | |
| 7,402,206 B2 | 7/2008 | Isberg et al. | |
| 7,572,313 B2* | 8/2009 | Palanisamy | C22C 29/06 75/241 |
| 8,017,240 B2 | 9/2011 | Strock | |
| 8,192,850 B2* | 6/2012 | Brinley | C23C 4/06 428/698 |
| 9,598,972 B2 | 3/2017 | Strock | |
| 9,850,566 B2 | 12/2017 | Zimmermann et al. | |
| 10,036,402 B2 | 7/2018 | Amini et al. | |
| 2002/0197155 A1 | 12/2002 | Howard et al. | |
| 2003/0228483 A1 | 12/2003 | Fiala et al. | |
| 2005/0155454 A1 | 7/2005 | Fiala et al. | |
| 2005/0233160 A1 | 10/2005 | Fiala et al. | |
| 2005/0262965 A1* | 12/2005 | Palanisamy | C22C 29/16 75/236 |
| 2005/0275143 A1 | 12/2005 | Toth | |
| 2007/0122639 A1 | 5/2007 | Fiala et al. | |
| 2008/0131686 A1* | 6/2008 | Strock | C23C 4/02 428/332 |
| 2009/0202814 A1* | 8/2009 | Jabado | C23C 28/324 428/325 |
| 2010/0055492 A1 | 3/2010 | Barsoum et al. | |
| 2012/0295825 A1 | 11/2012 | Dorfman et al. | |
| 2014/0287149 A1* | 9/2014 | Zimmermann | C23C 4/12 427/446 |
| 2015/0308281 A1* | 10/2015 | Strock | F16J 15/444 415/173.4 |
| 2016/0024955 A1 | 1/2016 | Amini et al. | |
| 2016/0230288 A1 | 8/2016 | Amini et al. | |
| 2016/0289844 A1 | 10/2016 | Strock et al. | |
| 2016/0333717 A1 | 11/2016 | Strock | |
| 2017/0030214 A1 | 2/2017 | Strock et al. | |
| 2018/0347390 A1 | 12/2018 | Wilson et al. | |

FOREIGN PATENT DOCUMENTS

| | | |
|---|---|---|
| DE | 102015212400 A1 | 1/2017 |
| EP | 1908925 A2 | 4/2008 |
| WO | 03046247 A1 | 6/2003 |
| WO | 2012000742 A1 | 1/2012 |
| WO | 2017080645 A1 | 5/2017 |

OTHER PUBLICATIONS

USPTO STIC, Search Report, dated Aug. 25, 2017 for U.S. Appl. No. 14/722,263, pp. 1-3.

\* cited by examiner

CHEMISTRY BASED METHODS OF MANUFACTURE FOR MAXMET COMPOSITE POWDERS

CROSS-REFERENCE TO RELATED APPLICATIONS

The instant application is a divisional application of U.S. patent application Ser. No. 14/722,263, filed May 27, 2015, which claims benefit of U.S. Patent Application No. 62/003,159, filed May 27, 2014, and entitled "Chemistry Based Methods of Manufacture for Maxmet Composite Powders", the disclosure of which is incorporated by reference herein in its entirety as if set forth at length.

BACKGROUND

The disclosure relates to manufacture of materials used for enhanced abradable coatings for a gas turbine engine.

In compressor and turbine sections of a gas turbine engine, air seals are used to seal the interface between a rotating structure, such as a hub or a blade, and a fixed structure, such as a housing or a stator. For example, typically, circumferentially arranged blade seal segments are fastened to a housing, for example, to provide the seal.

Relatively rotating components of a gas turbine engine are not at all times perfectly cylindrical or coaxial with one another during engine operation. As a result, the relatively rotating components may occasionally rub against one another. To this end, an abradable material typically is adhered to the blade seal segments or full rings and/or the rotating component.

Abradable seals in the compressor section of gas turbine engines include characteristics such as, good abradability, spall resistance, and erosion resistance. Abradable seals are required to exhibit a smooth surface, low gas permeability, and environmental durability. The seal is a sacrificial element in order to minimize blade wear, so it is abradable. The seal must also minimize gas flow leakage through the seal, so a low gas permeability is desirable.

Abradable coatings for the seals are always a compromise between abradability and erosion resistance. In order to maintain blade tip clearances over time, the seal material needs to be tough and resistant to erosion. Conventional seal materials tend to be soft and weak in order to have good abradability. Recently, MAXMETs (MAX phase reinforced metal matrix composites) have shown tremendous promise as next generation compressor abradable coatings.

MAXMET composite coatings processed by powder metallurgy routes and thermal spraying techniques have showed excellent promise due to increased erosion resistance, and significant reduction in coefficient of friction by incorporation of up to 50 vol. % MAX phases into current abradable systems. The wear response of the newly developed coatings have also showed significant changes in the rub mechanism. However, to scale up, methods of manufacture and processing parameters for enabling MAXMET applications as low and high temperature Low Pressure Compressor and High Pressure Compressor abradable coatings is currently under development. One of the challenges during use of thermal spraying methods to create abradable coatings is oxidation and low flow behavior of MAX phase particles.

SUMMARY

In accordance with the present disclosure, there is provided a process to manufacture MAXMET particles by encapsulating the MAX phase particles in a metallic shell, the choice of which depends on the end use of the abradable coating. The metal shell minimizes oxidation of the MAX phase particles during the spray process and permits a more efficient thermal deposition of the MAXMET composite, which in turn contributes to improved erosion resistance and abradability.

In accordance with the present disclosure, there is provided a method of manufacturing a gas turbine engine air seal comprising forming at least one MAX phase particle. The method includes coating the at least one MAX phase particle with a metallic shell. The method includes applying the at least one MAX phase metallic coated particle to a surface of a substrate of the air seal to form an abradable layer of a MAXMET composite abradable material from the at least one MAX phase metallic coated particle.

In accordance with the present disclosure, there is provided chemical methods to clad MAX phase particles with a metallic shell to produce MAXMET particles for thermal spraying methods. Among these methods are, a) wet chemistry approach via a redox reaction to produce metallic shell from a metallic salt in a solution on the surface of MAX phase particles, b) combination of wet chemistry and gas reduction to make metallic particles from metal oxides resulted from solution, c) chemical vapor deposition, d) electrochemical reduction, and e) agglomeration of fine (<5-10 micron) clad MAX phase particles during the plating process to form multi-particulate MAXMET domains of approximately 16-150 micron size suitable for thermal spray deposition.

In accordance with the present disclosure, there is provided an air seal in a gas turbine engine comprising an abradable layer comprising a MAXMET composite material having MAX phase particles coated with a metallic shell.

In another and alternative embodiment the substrate is coupled to the abradable layer.

In another and alternative embodiment the metallic shell comprises Al or the metallic shell comprises Ni.

In another and alternative embodiment the MAX phase is defined by the formula $M_{n+1}AX_n$ where n is a number from 1 to 3.

In another and alternative embodiment a bond coat layer is adhered to at least a portion of the substrate. The abradable layer is adhered to the bond coat.

In accordance with the present disclosure, there is provided a gas turbine engine comprising a first structure. A second structure is rotatable relative to the first structure, wherein one of the first structure and second structure comprises a substrate. An abradable layer is coupled to the substrate wherein the abradable layer comprises a MAXMET composite material having MAX phase particles coated with a metallic shell.

In another and alternative embodiment the metallic shell comprises Ni or the metallic shell comprises Al. The MAX phase is defined by the formula $M_{n+1}AX_n$ where n is a number from 1 to 3.

In accordance with the present disclosure, there is provided a method of manufacturing a gas turbine engine air seal comprises forming at least one MAX phase particle. The method includes coating the at least one MAX phase particle with a metallic shell and applying the at least one MAX phase metallic coated particle to a surface of a substrate of the air seal to form an abradable layer of a MAXMET composite abradable material from the at least one MAX phase metallic coated particle.

In another and alternative embodiment the coating step is selected from the group consisting of a redox reaction; a combination of wet chemistry and gas reduction; chemical vapor deposition, electrochemical reduction, and agglomeration of fine (<5-10 micron) clad MAX phase particles during a plating process.

In another and alternative embodiment the method also includes the agglomeration of fine (<5-10 micron) clad MAX phase particles during the plating process to form multi-particulate MAXMET domains of approximately 16-150 micron size suitable for thermal spray deposition.

In another and alternative embodiment the step of applying the at least one MAX phase metallic coated particle to a surface of a substrate of said air seal comprises thermal spray deposition.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
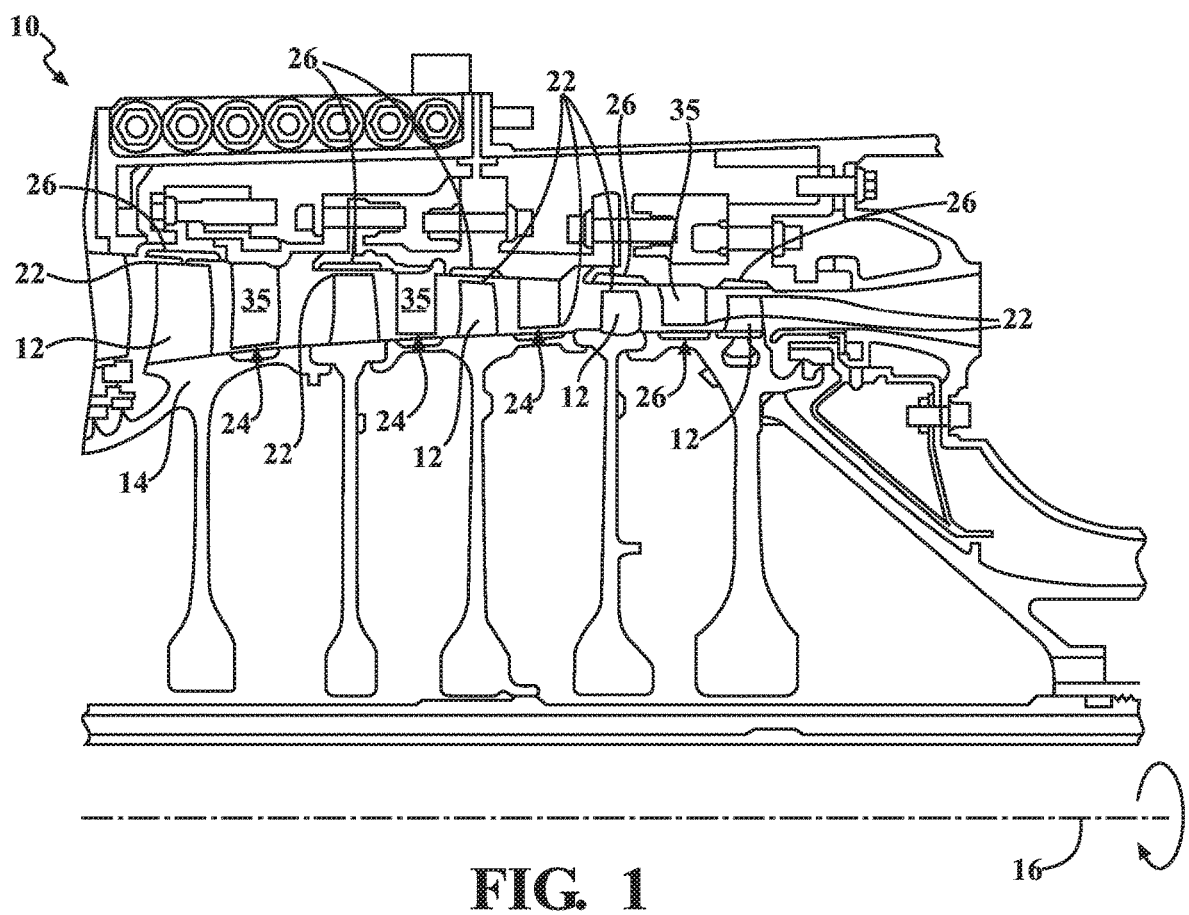
FIG. 1 shows a perspective view of a portion of a gas turbine engine incorporating an air seal.

FIG. 1 shows a portion of a gas turbine engine 10, for example, a high pressure compressor section. The engine 10 has blades 12 that are attached to a hub 14 that rotate about an axis 16. Stationary vanes 18 extend from an outer case or housing 20, which may be constructed from a nickel alloy, and are circumferentially interspersed between the turbine blades 15, which may be constructed from titanium in one example. A first gap 22 exists between the blades 12 and the outer case 20, and a second gap 24 exists between the vanes 18 and the hub 14.

Figure 2:
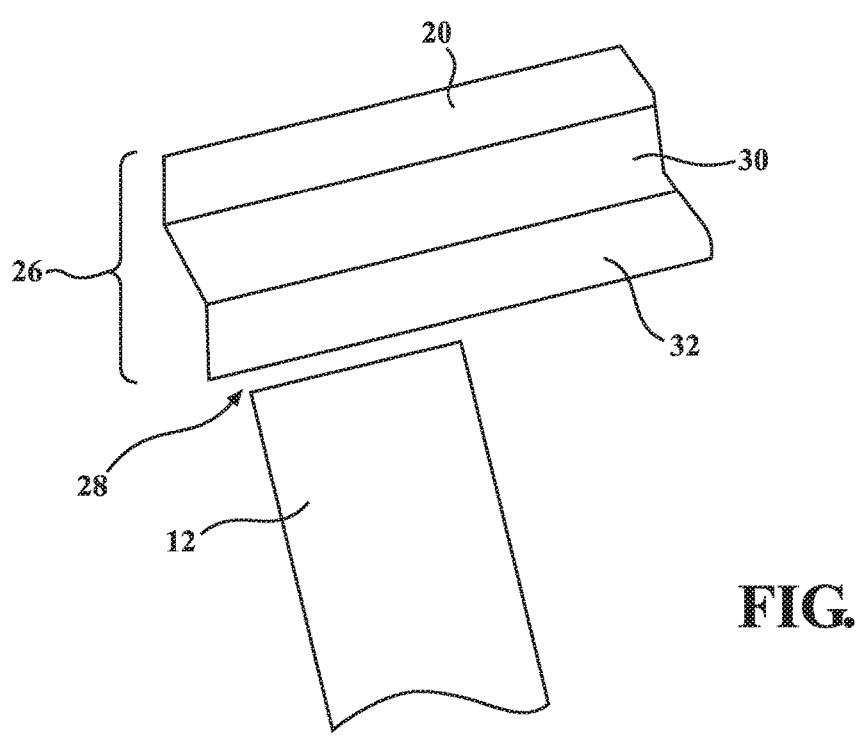
FIG. 2 shows a schematic view of an air seal.

Air seals 26 (FIG. 2) are positioned in at least one of the first and second gaps 22, 24. Further, the air seals 26 may be positioned on: (a) the outer edge of the blades 12; (b) the inner edge of the vanes 18; (c) an outer surface of the hub 14 opposite the vanes 18; and/or (d) as shown in FIG. 2, on the inner surface of outer case 20 opposite the blades 12. It is desirable that the gaps 22, 24 be minimized and interaction between the blades 12, vanes 18 and seals 26 occur to minimize air flow around blade tips or vane tips.

In one example shown in FIG. 2, the air seal 26 is integral with and supported by a substrate, in the example, the outer case 20. That is, the air seal 26 is deposited directly onto the outer case 20 without any intervening, separately supported seal structure, such as a typical blade outer air seal. The tip of the blade 28 is arranged in close, proximity to the air seal 26. It should be recognized that the seal provided herein may be used in any of a compressor, a fan or a turbine section and that the seal may be provided on rotating or non-rotating structure.

The air seal 26 includes a bond coat 30 deposited onto the outer case 20 or other structure/substrate. In an exemplary embodiment, the bond coat 30 may be a thermally sprayed bond coat. In another example, the bond coat 30 may comprise an alloy, such as a MCrAlY composition applied by air plasma spray. A composite topcoat 32 acts as an abradable layer that is deposited on the bond coat 30 opposite the outer case 20. In an exemplary embodiment, the metallic bond coat 30 may be replaced by an adhesive layer. The adhesive may be polyurethane in the front stages of the compressor or in the fan where ambient temperature is sufficiently low (e.g., less than about 300 degrees Fahrenheit.

Figure 3:
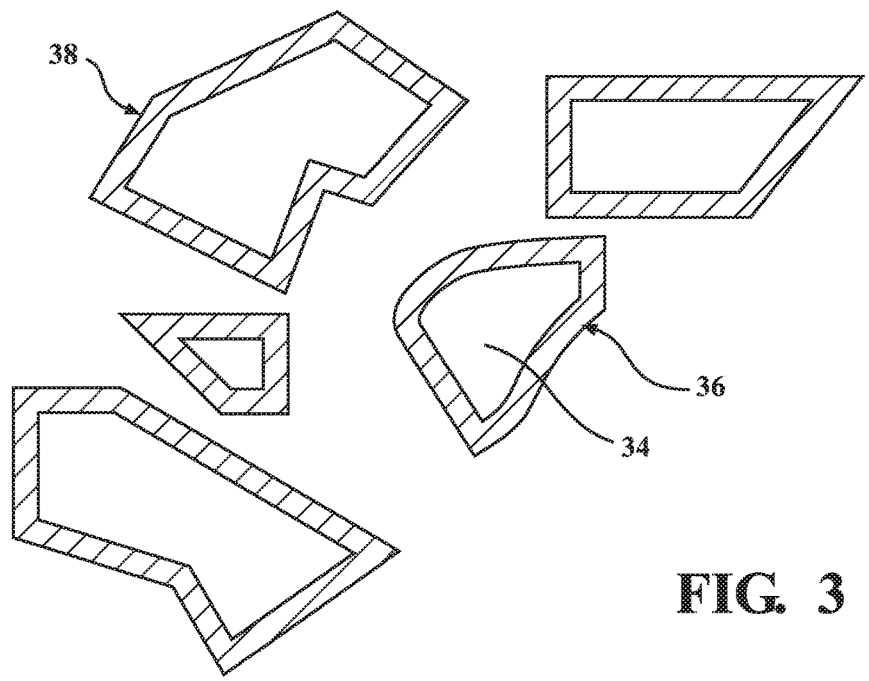
FIG. 3 shows a cross sectional view of a coated MAX phase particle powder before being applied.
Figure 4:
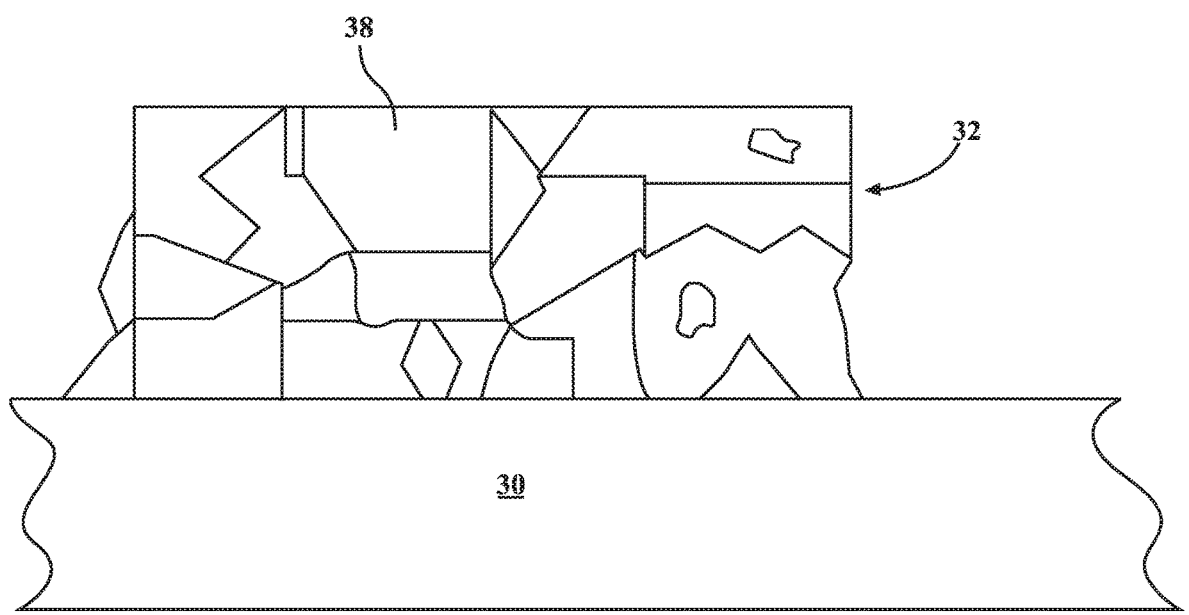
FIG. 4 shows a MAXMET composite abradable coating on a substrate.

The Referring also to FIGS. 3 and 4, in an exemplary embodiment, the composite abradable coating 32 comprises a MAX phase solids. In an exemplary embodiment the coating includes MAX phase particles 34. In an exemplary embodiment the MAX phase particles can include ternary carbide or nitride matrix material that may include MAX phases which are defined by the formula $M_{n+1}AX_n$ where n is a number from 1 to 3. M is an early transition metal element, A is an A group element, and X is carbon (C) or nitrogen (N). Early transition metals are any element in the d-block of the periodic table, which includes groups 3 to 12 on the periodic table. A-group elements are mostly group IIA or IVA. The metal matrix is at least one of a low, medium, and high melting point metal or metal alloy. Low melting point metals or metal alloys are those approximately in the range of from 100 degrees Centigrade to 300 degrees Centigrade. Medium melting point metals or metal alloys are those approximately in the range of 300 degrees Centigrade to 1000 degrees Centigrade. High melting point metals or metal alloys are those in the range of 1000 degrees Centigrade and greater. MAXMET materials are characterized by excellent mechanical properties and improved toughness, high damage tolerance, high thermal stability and improved erosion resistance.

Examples of suitable MAX phase particles 34 include, but are not limited to: ternary carbides and ternary nitrides. The atomic layers within the MAX phase particles 34 are layers of hard, strong, high modulus carbide. The atoms are also arranged in layers so that they form very weak crystallographic planes. Thus, both high modulus strong planes and very weak planes are present in matrix material 34. This results in kink band forming tendencies, which gives it both ceramic and metallic properties. The kink bands provide toughness similar to a metal, making MAX phase material 34 capable of withstanding impact damage conditions while the high modulus and high hardness of the carbide layers make MAX phase material 34 capable of withstanding fine particle erosion. At the same time, the slip planes have low strength such that MAX phase material 34 is machinable using a sharp cutting point.

The MAX phase particles 34 can be encapsulated in a metallic shell 36 to form a MAXMET composite material 38. The metallic shell 36 can comprise any variety of materials depending on the end use of the abradable composite 32. In an exemplary embodiment, the metallic shell 36 can comprise a Ni shell material for use with Ni-based abradable composite materials. In another exemplary embodiment the metallic shell 36 can comprise an Al shell for use with Al based abradable composite materials. Besides Ni and Al, depending on the applications, other metals, such as W, Co, Hf, Cr, and the like, can be applied as a coating layer.

The metallic shell 36 minimizes oxidation of the MAX phase particles 34 during the spray application process. The metallic shell 36 permits more efficient thermal deposition of the MAXMET composite material 38. The efficient thermal deposition of the MAXMET composite material 38 contributes to improved erosion resistance and abradability.

The metallic shell 36 cladding can be created by a variety of methods. For a given element, for instance, Al, certain procedures may be unique in order to create good bonding to MAX phase. Among these methods are, a) wet chemistry approach via a redox reaction to produce metallic shell from a metallic salt in a solution on the surface of MAX phase particles, b) a combination of wet chemistry and gas reduction to make metallic particles from metal oxides resulted from solution, c) chemical vapor deposition, d) electrochemical reduction, e) agglomeration of fine (<5-10 micron) clad MAX phase particles during the plating process to form multi-particulate MAXMET domains of approximately 16-150 micron size suitable for thermal spray deposition and f) electroless plating via an auto-catalytic chemical reaction to produce nickel coatings on the metal. The procedure and nickel bath (e.g. nickel chloride+hydrated sodium hypophosphite ($NaPO_2H_2O$) for electroless plating is commercially available and cost-effective. Methods c and d are ideal for fabrication of active metals with very negative electrode potentials, such as Al, Mg, and so on, which may not be able to be achieved with other methods.

The advantages of the methods described herein are easy handling, and scalability of metal synthesis/cladding. The metal shell 36 produced by these processes can minimize oxidation of the MAX phase particles 34 during the spray process and permits a more efficient thermal deposition of the MAXMET composite 38, which in turn contributes to improved erosion resistance and abradability.

One or more embodiments have been described. Nevertheless, it will be understood that various modifications may be made. For example, the present disclosure seeks to provide a method to manufacture MAXMET particles by encapsulating the MAX phase particles in a metallic shell, the choice of which depends on the end use of the abradable, e.g. Ni shell for Ni-based abradable coating materials or Al shell for Al-based abradable coating materials. The metal shell minimizes oxidation of the MAX phase particles during the spray process and permits a more efficient thermal deposition of the MAXMET composite, which in turn contributes to improved erosion resistance and abradability. Accordingly, other embodiments are within the scope of the following claims.

What is claimed is:

1. An air seal in a gas turbine engine comprising:
an abradable layer comprising a MAXMET composite material having MAX phase particles encapsulated with a metallic shell.

2. The air seal of claim 1, further comprising:
a substrate coupled to said abradable layer.

3. The air seal of claim 1, wherein said metallic shell comprises Al.

4. The air seal of claim 1, wherein said MAX phase is defined by the formula $M_{n+1}AX_n$ where n is a number from 1 to 3.

5. The air seal of claim 1, wherein said metallic shell comprises Ni.

6. The air seal of claim 1, further comprising:
a bond coat layer adhered to at least a portion of the substrate;
said abradable layer adhered to said bond coat.

7. A gas turbine engine comprising:
a first structure;
a second structure rotatable relative to the first structure, wherein one of the first structure and second structure comprises a substrate; and
an abradable layer coupled to said substrate wherein said abradable layer comprises a MAXMET composite material having MAX phase particles encapsulated with a metallic shell.

8. The gas turbine engine of claim 7, wherein the metallic shell comprises Ni.

9. The gas turbine engine of claim 7, wherein the metallic shell comprises Al.

10. The gas turbine engine of claim 7 wherein said MAX phase is defined by the formula $M_{n+1}AX_n$ where n is a number from 1 to 3.

* * * * *